United States Patent
Simard

(10) Patent No.: US 9,518,729 B2
(45) Date of Patent: Dec. 13, 2016

(54) LIGNIN FIRED SUPERCRITICAL OR NEAR CRITICAL WATER GENERATOR, SYSTEM AND METHOD

(75) Inventor: Michel Adam Simard, Berwyn, PA (US)

(73) Assignee: Renmatix, Inc., King of Prussia, PA (US)

( * ) Notice: Subject to any disclaimer, the term of this patent is extended or adjusted under 35 U.S.C. 154(b) by 1070 days.

(21) Appl. No.: 13/366,729

(22) Filed: Feb. 6, 2012

(65) Prior Publication Data

US 2012/0145094 A1 Jun. 14, 2012

Related U.S. Application Data

(60) Provisional application No. 61/569,851, filed on Dec. 13, 2011.

(51) Int. Cl.
| | |
|---|---|
| *F22B 31/04* | (2006.01) |
| *F22B 1/18* | (2006.01) |
| *F23G 5/02* | (2006.01) |
| *F23G 5/04* | (2006.01) |
| *F23G 5/46* | (2006.01) |
| *F23G 7/10* | (2006.01) |

(52) U.S. Cl.
CPC . *F22B 1/18* (2013.01); *F23G 5/02* (2013.01); *F23G 5/04* (2013.01); *F23G 5/46* (2013.01); *F23G 7/10* (2013.01); *F23G 2201/702* (2013.01); *F23G 2206/203* (2013.01); *F23G 2207/20* (2013.01); *F23G 2900/50206* (2013.01); *F23G 2900/55011* (2013.01); *Y02E 20/12* (2013.01)

(58) Field of Classification Search
CPC .................................................. C02F 1/4618
USPC ......... 122/16.1, 22, 211, 466, 467, 468, 470
See application file for complete search history.

(56) References Cited

U.S. PATENT DOCUMENTS

| | | | |
|---|---|---|---|
| 2,822,784 A | 2/1958 | Heller | |
| 4,535,593 A | 8/1985 | Sakka | |
| 4,674,285 A | 6/1987 | Durrant et al. | |
| 4,714,591 A * | 12/1987 | Avedesian | 422/140 |
| 4,987,954 A * | 1/1991 | Boucher | 165/138 |
| 5,429,645 A * | 7/1995 | Benson et al. | 44/589 |

(Continued)

FOREIGN PATENT DOCUMENTS

| | | |
|---|---|---|
| JP | 2001050010 A | 2/2001 |
| JP | 2001079571 A | 3/2001 |

(Continued)

OTHER PUBLICATIONS

Hill et al., "Optimization of lignin conversion into value-added fuels and chemicals: Characterization of Reaction Products," *Abstracts of Papers, 234th ACS National Meeting*, Boston, MA, USA, Aug. 19-23, 2007.

(Continued)

*Primary Examiner* — Gregory A Wilson
(74) *Attorney, Agent, or Firm* — Travis B. Gasa; Andrew G. Bunn; Ballard Spahr LLP

(57) ABSTRACT

Methods are disclosed for providing recovered lignin of suitable quantity and quality to provide sufficient heating value to power the generation of supercritical or near critical water without the need for outside sources of energy. Supercritical or near critical water generator devices and systems are also disclosed.

9 Claims, 2 Drawing Sheets

(56) References Cited

U.S. PATENT DOCUMENTS

| | | | |
|---|---|---|---|
| 5,558,783 | A | 9/1996 | McGuinness |
| 5,705,369 | A | 1/1998 | Torget et al. |
| 6,022,419 | A | 2/2000 | Torget et al. |
| 7,547,539 | B2 | 6/2009 | Ikegami et al. |
| 7,960,325 | B2 | 6/2011 | Kluko |
| 8,721,980 | B2* | 5/2014 | Peters .................... 422/187 |
| 2001/0050096 | A1 | 12/2001 | Costantini et al. |
| 2007/0217980 | A1* | 9/2007 | Garcia-Ortiz et al. ....... 423/219 |
| 2009/0169418 | A1* | 7/2009 | Rautio et al. ............. 420/586.1 |
| 2009/0205546 | A1 | 8/2009 | Kluko |
| 2009/0223612 | A1 | 9/2009 | McKnight et al. |
| 2009/0229599 | A1 | 9/2009 | Zhang |
| 2010/0043782 | A1 | 2/2010 | Kilambi et al. |
| 2010/0055629 | A1 | 3/2010 | McKnight et al. |
| 2010/0069626 | A1 | 3/2010 | Kilambi |
| 2010/0077752 | A1 | 4/2010 | Papile |
| 2010/0146842 | A1 | 6/2010 | Dumenil |
| 2010/0146843 | A1 | 6/2010 | Dumenil |
| 2010/0170504 | A1 | 7/2010 | Zhang |
| 2010/0200229 | A1 | 8/2010 | Jefferd |
| 2011/0076724 | A1 | 3/2011 | Dumenil |
| 2011/0126448 | A1 | 6/2011 | Dumenil |
| 2011/0171709 | A1 | 7/2011 | Bardsley |
| 2011/0237838 | A1 | 9/2011 | Zmierczak et al. |
| 2011/0239973 | A1 | 10/2011 | Qin |
| 2011/0283926 | A1* | 11/2011 | Klutz .................... F26B 25/007 110/218 |
| 2012/0108798 | A1* | 5/2012 | Wenger et al. ............... 530/500 |
| 2012/0205320 | A1* | 8/2012 | Lean et al. .................... 210/737 |
| 2012/0321528 | A1* | 12/2012 | Peters .......................... 422/187 |
| 2013/0193087 | A1* | 8/2013 | Moriya et al. ................ 210/774 |

FOREIGN PATENT DOCUMENTS

| | | | |
|---|---|---|---|
| KR | 1020110047862 | A | 5/2011 |
| WO | 00/61276 | A1 | 10/2000 |
| WO | 03051770 | A1 | 6/2003 |
| WO | 2010003655 | A2 | 1/2010 |
| WO | 2010/045576 | A2 | 4/2010 |
| WO | 2010069516 | A2 | 6/2010 |
| WO | 2011/007369 | A1 | 1/2011 |

OTHER PUBLICATIONS

Hotta et al., "Milestones for CFB and OTU technology—the 460 MWe Lagisza supercritical boiler project update," *Proceedings—Annual Intl. Pittsburgh Coal Conf.*, 24$^{th}$, 275/1-275/9 (2007).

Kozinski et al., "Elucidating the pathway for transformation of waste wood in supercritical water," *Pacifichem 2010, Intl. Chem. Congress of Pacific Basin Soc.*, Honolulu, HI, USA, Dec. 15-20, 2010.

Liao et al., "Energy-flow analysis and economic evaluation of supercritical water oxidation process of pulping black liquor," *Zhongguo Zaozhi Xuebao*, 25(3): 58-63 (2010), China.

Lu et al., "Preparation and characterization of lignin powder micronized by a supercritical antisolvent (SAS) process," *Advanced Materials Research*, 233-235: 1642-1645 (2011).

Ma et al., "Experimental study on liquefaction of biomass in subcritical and supercritical water," *Huanjing Kexue Yu Jishu*, 34(4): 152-154 (2011), China.

Roennlund et al., "Waste to energy by industrially integrated supercritical water gasification—Effects of alkali salts in residual by-products from the pulp and paper industry," *Energy*, 36(4): 2151-2163 (2011), Oxford, United Kingdom.

Shirai, "Fuels and chemicals production from biomass and biomass derived compounds with high-temperature water and high-pressured carbon dioxide," *Pacifichem 2010, Intl. Chem. Congress of Pacific Basin Soc.*, Honolulu, HI, USA, Dec. 15-20, 2010.

U.S. Appl. No. 13/437,156, "Non-Final Office Action", mailed May 23, 2013 (11 pages).

Final Rejection issued by the USPTO on Jan. 2, 2014 for U.S. Appl. No. 13/437,156, filed Apr. 2, 2012 (Applicants—Renmatix, Inc.; Inventors—Simard et al.;) (12 pages).

International Patent Application No. PCT/US2012/067529, International Search Report and Written Opinion, mailed Apr. 24, 2013 (13 pages).

* cited by examiner

LIGNIN FIRED SUPERCRITICAL OR NEAR CRITICAL WATER GENERATOR, SYSTEM AND METHOD

CROSS REFERENCE TO RELATED APPLICATIONS

This application claims the benefit of U.S. Application No. 61/569,851, filed Dec. 13, 2011, the entire disclosure of which is incorporated herein by reference.

FIELD OF THE INVENTION

The present invention generally relates to devices, systems, and methods of providing recovered lignin of suitable quantity and quality to provide sufficient heating value to power the generation of supercritical or near critical water without the need for outside sources of energy.

BACKGROUND OF THE INVENTION

There are a number of processes for converting lignocellulosic biomass into liquid streams of various sugars. Certain preferred processes are based on supercritical water (SCW) or hot compressed water (HCW) technology, which offer several advantages including high throughputs, use of mixed feedstocks, separation of sugars, and avoidance of concentrated acids, microbial cultures, and enzymes. Processes using hot compressed water may have two distinct operations: pre-treatment and cellulose hydrolysis. The pre-treatment process hydrolyzes the hemicellulose component of the lignocellulosic biomass and cellulose hydrolysis (CH) process, as its name infers, hydrolyzes the cellulose fibers. The resultant five carbon (C5) and six carbon (C6) sugar streams are recovered separately. The remaining solids, which consist mostly of lignin, are preferably recovered, such as through filtration, and may be used as a fuel to provide thermal energy to the process itself or for other processes.

The CH process uses a significant amount of supercritical water (T>373° C., P>3,206 psi). Generally, the SCW must be generated in a heater at high pressure and pumped into the process. Ideally, lignin of suitable quantity and quality could be recovered during the process to provide sufficient heating value to power the generation of SCW without the need for outside sources of energy. The methods, devices, and systems of the present invention are directed toward these, as well as other, important ends.

SUMMARY OF THE INVENTION

In one embodiment, the invention is directed to methods of generating supercritical or near critical water, comprising:
providing water;
applying to said water a pressure of at least about 221 bar to form compressed water; and
heating said compressed water to a temperature of at least about 373° C.;
wherein said heating comprises combusting a fuel composition comprising lignin; and
wherein said lignin has a heating value of at least about 3,000 BTU/lb, as measured by ASTM-D240 or D5865.

In another embodiment, the invention is directed to methods of generating supercritical or near critical water, comprising:
providing water;
heating said water to a temperature of at least about 373° C. to form superheated steam;
applying to said superheated steam a pressure of at least about 221 bar;
wherein said heating comprises combusting a fuel composition comprising lignin; and
wherein said lignin has a heating value of at least about 3,000 BTU/lb, as measured by ASTM-D240 or D5865.

In certain aspects, the invention is directed to supercritical or near critical water generators, comprising:
at least one pump adapted to provide water at a pressure of at least about 221 bar to form compressed water;
at least one fuel combustion apparatus adapted for combusting a fuel composition comprising lignin;
wherein said lignin is generated in a process wherein said supercritical or near critical water generator is employed;
wherein said lignin has a heating value of at least about 3,000 BTU/lb, as measured by ASTM-D240 or D5865; and
optional controls.

In certain aspects, the invention is directed to systems for generating supercritical or near critical water, comprising:
a supercritical or near critical water generator described herein;
a fuel handling system adapted to transport said fuel composition to said fuel combustion apparatus;
a water circulation system adapted to transport said compressed water in proximity of said fuel combustion apparatus adequate to heat said compressed water to a temperature of at least about 373° C. to produce said supercritical or near critical water; and
optional controls.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1:
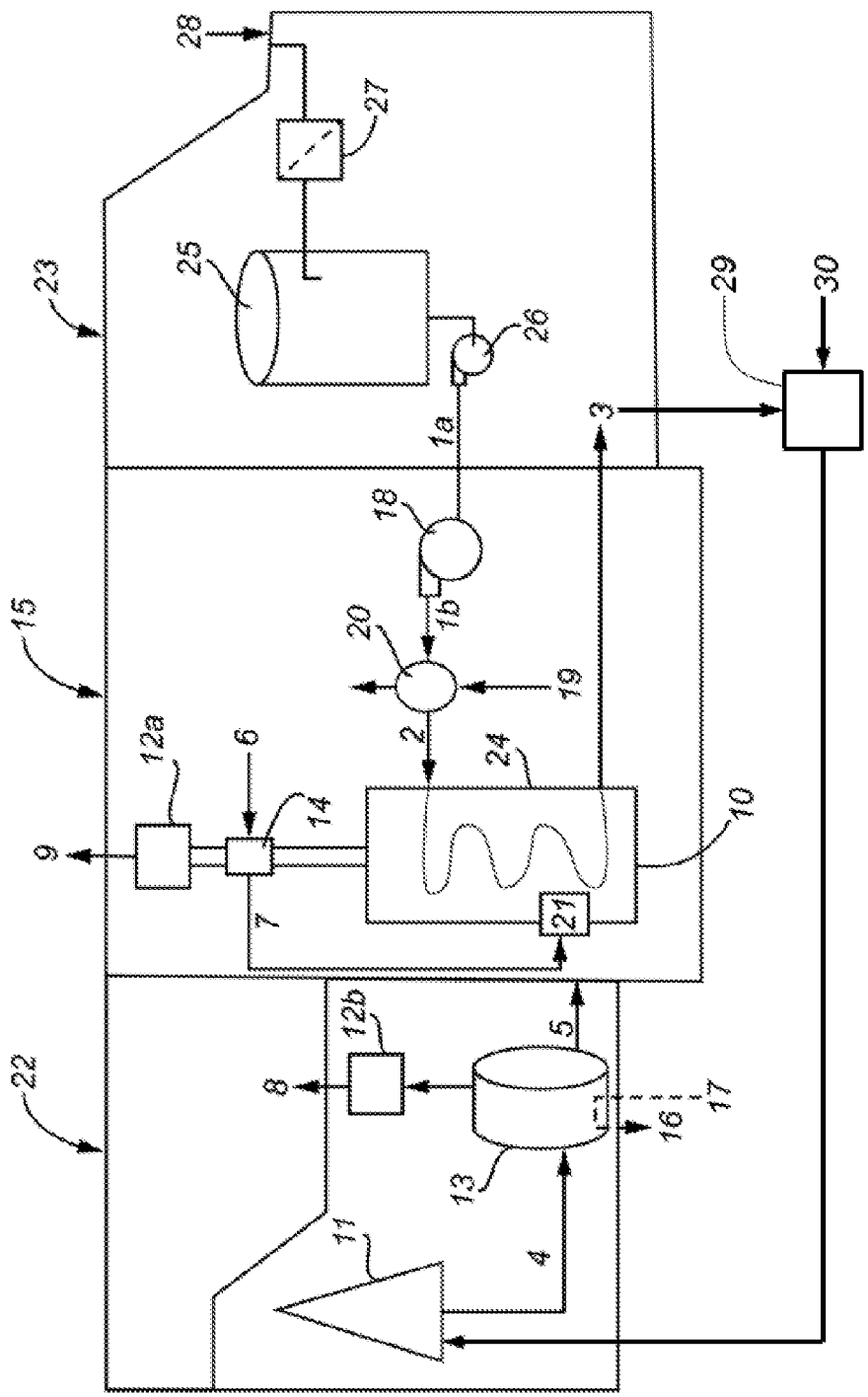
FIG. 1 is a block flow diagram of a supercritical or near critical water generator device of one embodiment of the invention.

As employed above and throughout the disclosure, the following terms, unless otherwise indicated, shall be understood to have the following meanings.

As used herein, the singular forms "a," "an," and "the" include the plural reference unless the context clearly indicates otherwise.

While the present invention is capable of being embodied in various forms, the description below of several embodiments is made with the understanding that the present disclosure is to be considered as an exemplification of the invention, and is not intended to limit the invention to the specific embodiments illustrated. Headings are provided for convenience only and are not to be construed to limit the invention in any manner. Embodiments illustrated under any heading may be combined with embodiments illustrated under any other heading.

The use of numerical values in the various quantitative values specified in this application, unless expressly indicated otherwise, are stated as approximations as though the minimum and maximum values within the stated ranges were both preceded by the word "about." In this manner, slight variations from a stated value can be used to achieve substantially the same results as the stated value. Also, the disclosure of ranges is intended as a continuous range including every value between the minimum and maximum values recited as well as any ranges that can be formed by such values. Also disclosed herein are any and all ratios (and ranges of any such ratios) that can be formed by dividing a recited numeric value into any other recited numeric value. Accordingly, the skilled person will appreciate that many such ratios, ranges, and ranges of ratios can be unambiguously derived from the numerical values presented herein and in all instances such ratios, ranges, and ranges of ratios represent various embodiments of the present invention.

As used herein, the phrase "substantially free" means have no more than about 1%, preferably less than about 0.5%, more preferably, less than about 0.1%, by weight of a component, based on the total weight of any composition containing the component.

A supercritical fluid is a fluid at a temperature above its critical temperature and at a pressure above its critical pressure. A supercritical fluid exists at or above its "critical point," the point of highest temperature and pressure at which the liquid and vapor (gas) phases can exist in equilibrium with one another. Above critical pressure and critical temperature, the distinction between liquid and gas phases disappears. A supercritical fluid possesses approximately the penetration properties of a gas simultaneously with the solvent properties of a liquid. Accordingly, supercritical fluid extraction has the benefit of high penetrability and good solvation.

Reported critical temperatures and pressures include: for pure water, a critical temperature of about 374.2° C., and a critical pressure of about 221 bar; for carbon dioxide, a critical temperature of about 31° C. and a critical pressure of about 72.9 atmospheres (about 1072 psig). Near critical water has a temperature at or above about 300° C. and below the critical temperature of water (374.2° C.), and a pressure high enough to ensure that all fluid is in the liquid phase. Sub-critical water has a temperature of less than about 300° C. and a pressure high enough to ensure that all fluid is in the liquid phase. Sub-critical water temperature may be greater than about 250° C. and less than about 300° C., and in many instances sub-critical water has a temperature between about 250° C. and about 280° C. The term "hot compressed water" is used interchangeably herein for water that is at or above its critical state, or defined herein as near-critical or sub-critical, or any other temperature above about 50° C. (preferably, at least about 100° C.) but less than subcritical and at pressures such that water is in a liquid state As used herein, a fluid which is "supercritical" (e.g. supercritical water, supercritical $CO_2$, etc.) indicates a fluid which would be supercritical if present in pure form under a given set of temperature and pressure conditions. For example, "supercritical water" indicates water present at a temperature of at least about 374.2° C. and a pressure of at least about 221 bar, whether the water is pure water, or present as a mixture (e.g. water and ethanol, water and $CO_2$, etc.). Thus, for example, "a mixture of sub-critical water and supercritical carbon dioxide" indicates a mixture of water and carbon dioxide at a temperature and pressure above that of the critical point for carbon dioxide but below the critical point for water, regardless of whether the supercritical phase contains water and regardless of whether the water phase contains any carbon dioxide. For example, a mixture of sub-critical water and supercritical $CO_2$ may have a temperature of about 250° C. to about 280° C. and a pressure of at least about 225 bar.

As used herein, "lignocellulosic biomass or a component part thereof" refers to plant biomass containing cellulose, hemicellulose, and lignin from a variety of sources, including, without limitation (1) agricultural residues (including corn stover and sugarcane bagasse), (2) dedicated energy crops, (3) wood residues (including hardwoods, softwoods, sawmill and paper mill discards), and (4) municipal waste, and their constituent parts including without limitation, lignocellulose biomass itself, lignin, $C_6$ saccharides (including cellulose, cellobiose, $C_6$ oligosaccharides, $C_6$ monosaccharides, $C_5$ saccharides (including hemicellulose, $C_5$ oligosaccharides, and $C_5$ monosaccharides), and mixtures thereof.

Accordingly, in one embodiment, the invention is directed to methods of generating supercritical or near critical water, comprising:
  providing water;
  applying to said water a pressure of at least about 221 bar to form compressed water; and
  heating said compressed water to a temperature of at least about 373° C.;
  wherein said heating comprises combusting a fuel composition comprising lignin; and
  wherein said lignin has a heating value of at least about 3,000 BTU/lb, as measured by ASTM-D240 or D5865.

In another embodiment, the invention is directed to methods of generating supercritical or near critical water, comprising:
  providing water;
  heating said water to a temperature of at least about 373° C. to form superheated steam;
  applying to said superheated steam a pressure of at least about 221 bar;
  wherein said heating comprises combusting a fuel composition comprising lignin; and
  wherein said lignin has a heating value of at least about 3,000 BTU/lb, as measured by ASTM-D240 or D5865.

A block flow diagram of one embodiment of the invention, where the supercritical water generator 15 in a system, is shown in FIG. 1:

1*a* Fresh water
1*b* Pressurized, fresh water
2 Pre-heated water
3 Supercritical water (SCW)
4 Lignin (wet)
5 Lignin (dry)
6 Air
7 Preheated combustion air
8 Vent to atmosphere
9 Flue or combustion gas
10 Ash
11 Lignin storage
12*a* Air pollution control
12*b* Air pollution control
13 Dryer (optional)
14 Air exchanger (optional)
15 SCW generator
16 Condensate
17 Low pressure steam
18 High pressure pump
19 Process-recovered heat stream (optional)
20 Heat exchanger (optional)
21 Fuel combustion apparatus (burner assembly)
22 Fuel handling system 23 Water handling system
24 Firebox
25 Water tank
26 Water transfer pump
27 Filter
28 Incoming water
29 Biomass conversion system
30 Lignocellulose Fresh water 1a is pumped using a high pressure pump 18 to a minimum pressure of 221 bar. The pressurized fresh water 1b is optionally pre-heated with a heat exchanger 20 to reduce fuel costs, if other process heat is available (such as process-recovered heat stream 19). The pre-heated water 2 then enters the firebox 24 of the supercritical water generator 15, where it is heated by the combustion of lignin fuel in a fuel combustion apparatus (burner assembly) 21, preferably generated by the process itself. Water 3 exits the generator 15 at supercritical or near critical conditions and water 3 is used to hydrolyze lignocellulose 30 in biomass conversion system 29. Lignin generated in biomass conversion system 29 is transported to fuel combustion apparatus 21 via fuel handling system 22. Combustion gases 9 exit the firebox through a flue or chimney (not shown), and are typically subject to pollution control equipment 12a before exiting to the atmosphere. The ash 10 (residue from solid fuel) is removed from the burner and firebox at the bottom of the supercritical water generator 15.

The system includes a supercritical or near-critical water generator 15, a fuel handling system 22 adapted to transport lignin fuel to the fuel combustion apparatus (burner assembly) 21, and a water circulation system 23 adapted to transport said fresh water 1a to the supercritical water generator 15 to heat said fresh water to a temperature of at least about 373° C. to produce said supercritical or near critical water 3.

The water supply system typically consists of a water source, filter, storage tank and transfer pump. Water is typically filtered, dechlorinated or otherwise demineralized by a filter. This filtered water is store in a storage tank. The filtered water is transferred from the storage tank to the supercritical water generator by means of a pump or gravity, and serves as fresh water to the supercritical water generator.

The lignin (wet) 4 may be stored in bulk storage 11 (or alternatively, in, piles, silos or similar manner), where it can accumulate moisture depending upon the storage conditions. It may be conveyed into an optional drying system 13 to remove the excess moisture. The dryer can be powered by steam 17, in which case condensate 16 would be recovered, but can also in other embodiments be powered by electricity or other heat sources. The dried lignin fuel 5 may then be combusted. At this stage, the moisture content is typically about 25% to about 35%, but may be as low as about 10%. The moisture that is driven off during the drying process may be vented to the atmosphere 8. This vent may require pollution control equipment 12b depending on the VOC content of the gases.

The air 6 required for combustion is optionally pre-heated in an air exchanger 14 to form pre-heated combustion air 7, by the flue gases 9 that leave the firebox 24. The pre-heated air 7 is then mixed with the dried lignin fuel 5, in the burner assembly 21 and ignited.

In another embodiment of the invention, system includes the following:
Fuel Handling System:
a. Inputs: wet solid fuel (lignin), LP steam (optional, if drying desired only)
b. Outputs: dry fuel (lignin), condensate (from steam), air emission through vent Water Circulation System:
a. Input: water (from river, city, well, etc.)
b. Output: filtered or treated water (also referred to herein as "fresh water")

SCW Generator:
a. Inputs: dry fuel (lignin), fresh water, combustion air
b. Outputs: SCW, ash, air emission The methods of the invention may be carried out as continuous processes, semi-batch processes, or batch processes. In certain embodiments of batch and semi-batch processes, the heating and pressurizing steps may be carried out sequentially or simultaneously or a combination of both.

In certain embodiments, the heating step comprises combusting lignin having heating value of at least about 5,000 BTU/lb, preferably at least about 7,500 BTU/lb, and even more preferably, about 8,000 BTU/lb to about 12,000 BTU/lb, wherein the heating value is measured by ASTM-D240 or D5865.

In certain embodiments, the fuel composition produces less than about 20%, by weight, based on the weight of the fuel composition, of ash, when combusted. In certain embodiments, the fuel composition produces less than about 10%, by weight, based on the weight of the fuel composition, of ash, when combusted.

In certain embodiments, the method optionally comprises drying the fuel composition comprising the lignin prior to combustion. Preferably, the moisture content of the fuel composition comprising the lignin is less than about 50% by weight, based on the total weight of the fuel composition, more preferably less than about 35% by weight, based on the total weight of the fuel composition, even more preferably less that about 25% by weight, based on the total weight of the fuel composition, and yet even more preferably less than about 10% by weight, based on the total weight of the fuel composition.

In certain embodiments, the lignin is in a powdered form. In other embodiments, the lignin is in a pelletized form. In yet other embodiments, the lignin is in a liquid form. Furthermore, the lignin may be in a combination of different forms (powdered, pelletized, and/or liquid form).

In certain embodiments, the lignin is produced in a biomass conversion system from hydrolysis of a material comprising lignocellulose, such as lignocellulose biomass obtained from a wide variety of sources including, but not limited to, agricultural residues (including straw, corn stover, and sugarcane bagasse), dedicated energy crops, wood residues (including hardwoods, softwoods, and sawmill and paper mill discards), municipal paper waste, and combinations thereof.

In certain embodiments, the water in said providing step is at about ambient pressure and about ambient temperature.

In certain embodiments, the water in said providing step is clean water, i.e., it is substantially free of impurities, such as, for example, inorganic compounds like chlorine, calcium, metals, and the like, and organic compounds. An example of suitable clean water is deionized water or typical feed water used for industrial boilers.

In certain embodiments, the fuel composition used in the methods of the invention further comprises at least one supplemental fuel, such as, for example, biomass (including lignocellulosic biomass and component parts thereof and non-lignocellulosic biomass), natural gas, coal (especially coal particulate), and mixtures thereof. For example, in certain embodiments, tree bark may be co-fired with the lignin. Particulate forms of each of the solid supplemental fuels are preferred for handling reasons.

In certain embodiments, the methods further comprise the step of preheating said water or said compressed water prior to said step of heating. In certain preferred embodiments, the water or said compressed water is preheated to a temperature of about 100° C. and about 300° C.

In certain embodiments, the heating step is carried out as multiple steps.

In certain embodiments, the pressurizing step is carried out as multiple steps.

In certain embodiments, the lignin has heating value of at least about 5,000 BTU/lb, preferably, at least about 7,500 BTU/lb, even more preferably about 8,000 BTU/lb to about 12,000 BTU/lb, wherein the heating value is measured by ASTM-D240 or D5865.

In certain embodiments, the fuel composition comprising lignin is in a powdered form, including both wet and dry powders. In certain embodiments, the fuel composition comprising lignin is in a pelletized form, including both wet and dry pellets. In certain embodiments, the fuel composition comprising lignin is in a liquid form. In certain embodiments, the fuel composition comprising lignin is a combination of powdered form, pelletized form, and/or liquid form.

In certain embodiments, the lignin is produced from a material comprising lignocellulose, such as lignocellulose biomass obtained from a wide variety of sources including, but not limited to, agricultural residues (including straw, corn stover and sugarcane bagasse), dedicated energy crops, wood residues (including hardwoods, softwoods, and sawmill and paper mill discards), and municipal paper waste and various combinations thereof.

In certain aspects, the invention is directed to supercritical or near critical water generators. Such generators heat water up to and above the critical point of water to create supercritical water or near critical water, as needed. Such devices comprise:

at least one pump (such as the pump adapted to provide water at a pressure of at least about 221 bar to form compressed water;

at least one fuel combustion apparatus (such as a burner, as shown in FIG. 1) adapted for combusting a fuel composition comprising lignin;

wherein said lignin is generated in a process wherein said supercritical or near critical water generator is employed;

wherein said lignin has a heating value of at least about 3,000 BTU/lb, as measured by ASTM-D240 or D5865; and optional controls.

In certain embodiments, the supercritical or near critical water generator further comprises at least one dryer for said fuel composition comprising lignin.

In certain aspects, the invention is directed to systems for generating supercritical or near critical water, comprising:

a supercritical or near critical water generator described herein;

a fuel handling system adapted to transport said fuel composition to said fuel combustion apparatus;

a water circulation system adapted to transport said compressed water in proximity of said fuel combustion apparatus adequate to heat said compressed water to a temperature of at least about 373° C. to produce said supercritical or near critical water; and optional controls.

In certain embodiments, the fuel combustion apparatus adapted for combusting a fuel composition comprising lignin having a heating value of at least about 5,000 BTU/lb, preferably, at least about 7,500 BTU/lb, and even more preferably about 8,000 BTU/lb to about 12,000 BTU/lb, wherein the heating value is measured by ASTM-D240 or D5865.

In certain embodiments, the fuel handling system is adapted to transport said fuel comprising lignin, wherein said lignin is in a powdered form, including both wet and dry powders. In certain embodiments, the fuel handling system is adapted to transport said fuel comprising lignin, wherein said lignin is in a pelletized form, including both wet and dry pellets. In certain embodiments, the fuel handling system is adapted to transport said fuel composition comprising lignin, wherein said lignin is in a liquid form. In certain other embodiments, the fuel handling system is adapted to transport said fuel composition comprising lignin, wherein said lignin is a combination of powdered form, pelletized form, and/or liquid form.

In certain embodiments, the system further comprises at least one preheater for said water or said compressed water in association with said water circulation system. In certain preferred embodiments, the preheater heats said water or said compressed water to a temperature of about 100° C. and about 300° C.

The present invention is further defined in the following Examples, in which all parts and percentages are by weight, unless otherwise stated. It should be understood that these examples, while indicating preferred embodiments of the invention, are given by way of illustration only and are not to be construed as limiting in any manner. From the above discussion and these examples, one skilled in the art can ascertain the essential characteristics of this invention, and without departing from the spirit and scope thereof, can make various changes and modifications of the invention to adapt it to various usages and conditions.

EXAMPLES

SCW Requirements

A lignin-fired SCW generator useful in the methods and systems may be used at the commercial scale at a feed rate of about 1000 dry tons/day of biomass. Based on modeling, the heat requirement equals approximately 200 MMBTU/hr. A suitable range of conditions for the lignin-fired SCW generator of the invention is shown in Table 1.

TABLE 1

| Design Element | Minimum | Maximum | Comment |
| --- | --- | --- | --- |
| Hours of Operation | 8,000 | 8,424 | 50 weeks/year, 24 hours/7 days |
| Temperature | 450° C. (797° F.) | 550° C. (887° F.) | SCW temperature at outlet |
| Pressure | 221 bar | 300 bar | SCW pressure at outlet |
| Flow | 300,000 lb/hr | 400,000 lb/hr | SCW mass flow rate |
| Water pre-heat temperature | 150° C. | 250° C. | Water temperature at inlet of the SCW generator, preheated through a recovery heat exchanger |

TABLE 1-continued

| Design Element | Minimum | Maximum | Comment |
|---|---|---|---|
| Heat Duty | 200 MMBTU/hr | 300 MMBTU/hr | |
| Turn Down | 75% | 100% | Operating capacity |
| Primary Fuel | | | Process derived lignin |
| Moisture Content | 25% | 35% | Air dried under cover in piles |
| Particle Size | 60 mesh | 10 mesh | |
| Secondary/Backup Fuel | | | Natural gas, expected use for 10% operating time |
| Combustion Air | 15% | 50% | Excess air, no preconditioning |
| Water Supply | | | |
| BOD5 | | 2 mg/L | |
| Cl | | 0.1 mg/L | Residual chlorine |
| Hardness | | 40 mg/L | As $CaCO_3$ |
| Burner | | | Typical circular, center feed port, with annular air/secondary fuel feeds |
| Combustion Chamber (Firebox) | | | Ceramic refractory with soot blowing capabilities |
| Heat Transfer Section | | | ½"-2" serpentine coils of 316L, with soot blowing capabilities |
| Flue Gas | 280° C. | 325° C. | Add on NOx and PM controls |
| Ash Handling | | | Conventional equipment and design |
| Construction/Modularity | | | 2 coils per generator |

Other Embodiments

Process Conditions

In certain preferred embodiments, the SCW generator needs to be capable of producing sub-critical and supercritical water at the conditions shown in Table 1 above.

The generator should utilize as its primary fuel the process-derived lignin with natural gas as secondary/backup. The generator should also be capable of about 25% turn down, i.e., from 100% to 75% operating capacity.

Primary Fuel Basis

The process derived lignin exits the process at a moisture content (MC) between about 50% and about 60%. Lignin above 35% MC may be difficult to combust, so some form of drying is preferred. The simplest method of drying is taking the lignin from the process separator and air dry it in a covered pile that is turned frequently for several days. Alternatively, excess process heat may be used to facilitate drying and shorten the drying cycle time. The high heating value, % volatile material, ash content, and ash fusion temperature are all important characteristics to monitor.

The lignin, upon drying, agglomerates to a particle size of approximately 60 mesh. The material is easily crumbled further, so no additional size reduction is anticipated. If a secondary biomass fuel, such as bark, is to be utilized, it is size reduced to the approximate lignin size and well mixed prior to combustion.

Combustion Air

For the most efficient combustion of the lignin at about 35% MC, the burner is capable of handling 50% excess air. This parameter may drop to about 15% if the lignin moisture content also dropped to about 15% to about 20%. The air is not expected to require any preheating or conditioning. The combustion air is blown in with the lignin through the burner. Excess air is supplied as either under fired, over fired, or a combination of under and over fired, again with blowers. The generator preferably has the capability of supplying both. In addition to ambient air as the oxidant, pure oxygen ($O_2$) would also work, but is not preferred due to cost.

SCW Supply

It is important to know the characteristics of the water supplied to the generator. Because of the extreme conditions in the generator, there should be minimal concentrations of chlorine and biological oxygen demand (BOD), and low/minimal concentrations of hardness and dissolved solids. Depending upon the source, pretreatment may include carbon filtration, softening, and membrane separation through a reverse osmosis (RO) unit.

The SCW feed may be pumped to pressure (about 4,100 psi (283 bar)) then optionally preheated (by a process heat recovery exchanger) to about 392° F. (200° C.) just prior to entering the generator.

Burner

Figure 2:
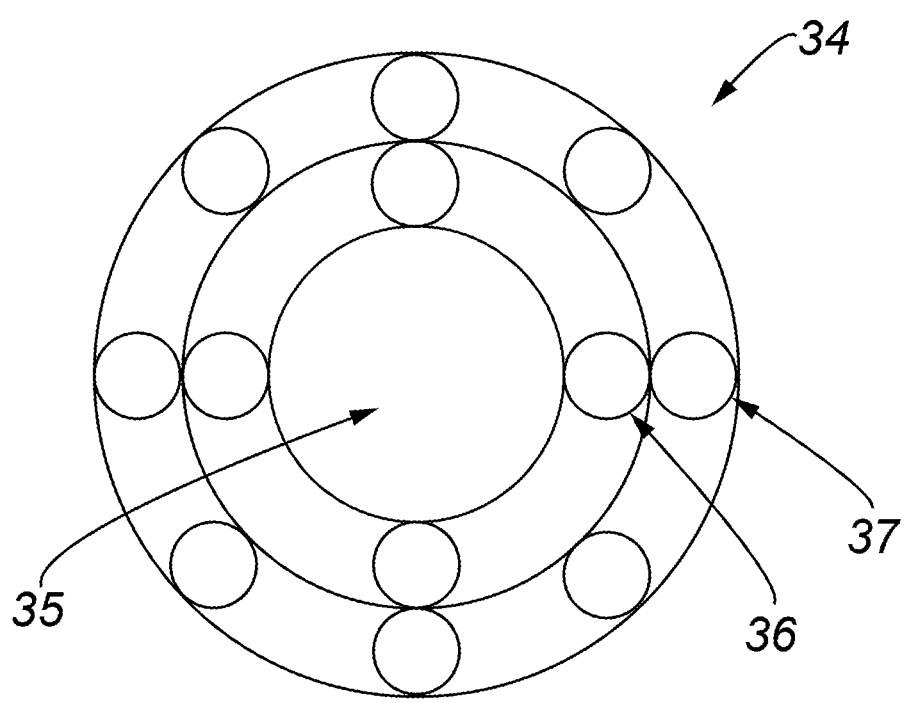
FIG. 2 is a schematic diagram of a solid fuel burner of one embodiment of the invention.

The burner 34 may be of typical design with a center feed port 35 for solid fuel surrounded by concentric forced air ports 36 and secondary fuel ports 37, such as shown in FIG. 2:

34 Burner
35 Center feed port
36 Forced air port
37 Secondary fuel port In some embodiments, the burner 24 may generate a flame length of approximately 30 feet horizontally and is dependent upon fuel particle size, moisture and carbon content. The flame temperature is between about 1,800° F. (982° C.) and about 2,000° F. (1,093° C.).

The solid fuel port may be at least about 4" in diameter, preferably about 6" to about 8" and about 4' to about 6' long, made of carbon steel, with enough flow to push flame temperature away from the burner end. The ports may be swirled to discharge fuel in a helical pattern within the firebox for increased travel length and burn time allowing for more complete combustion. Flame temperature preferably do not decrease significantly with turn down Combustion Chamber (Firebox) of Generator The size of the chamber may be about 40' long and combined with the heat transfer section be about 30' high. Ceramic refractory may be used for lining the chamber. As with any solid fuel, soot collecting on the outside of the tubes and within the firebox is a consideration. Allowance is made for pressure washing and/or the installation of soot blowers to minimize this fouling.

Heat Transfer Section of Generator

The process coil may be positioned above the burner firebox in a position to allow cross flow of the heated flue gas. In certain embodiments, it may be serpentine with 180° bends and seamlessly finned to enhance convective heat transfer. The coil may include about 1" to about 2" outside diameter tubes of stainless steel. Stainless steel (SAE 316L) is a suitable material of construction; however, because of the high pressure and possible sulfur impacts from the lignin, the material of construction may preferably include Inconel.

Flue Gas

In certain embodiments, it is desirable to add air pollution control devices for the nitrogen oxides (NOx) and particulate matter (PM) emitted. The flue gas should be no cooler than about 550° F. (288° C.) to avoid acid gas dew point issues and the accompanying corrosion concerns for the exhaust ducts and stack. Higher temperatures would allow for a smaller coil.

Because of the heat duty of the generator, NOx and PM need to be controlled to certain emission rate limits. High temperature baghouses or electrostatic precipitators (ESPs) are suitable for controlling PM. Selective catalytic or selective non-catalytic reduction (SCR/SNCR) units are suitable for controlling NOx as long as ammonia slip is adequately addressed.

Ash Handling

A rotary valve with drag chain conveyor (or equivalent) may be incorporated for ash handling.

Supercritical Water (SCW) or Near-Critical Water (NCW)

Once the water has been heated to supercritical or near critical conditions in the generator, it is injected directly into the process stream. In certain embodiments, the SCW or NCW is utilized as a "once through" utility. In other embodiments, the SCW or NCW may be recovered, treated, and reused.

Construction/Modularity

In certain embodiments of the SCW or NCW generator, it is of a transportable scale with two complete coil assemblies per generator. Splitting into two assemblies also minimizes the field erection and welding concerns allowing much of the welding to be performed at the shop versus in the field.

Startup/Shutdown

The SCW or NCW generator may be cold/warm started with water. Either natural gas or lignin may be used as the startup fuel with the possibility of using other biomass fuels if sized appropriately. Heat up of the unit is preferably slow and steady to avoid building up heat stresses at the entrances to the generator, the locations where the greatest temperature differentials exist.

For shutdowns, it is preferred that the generator never goes cold, but maintains a certain (warm) temperature in the firebox. Cold restarts create large heat stresses that can damage the generator.

Using the lignin as a fuel minimizes process operating costs and optimizes the overall process two-fold: it removes a large solid waste stream that would otherwise have to be disposed of and it minimizes the amount of fossil fuels combusted thus minimizing greenhouse gas emissions.

When ranges are used herein for physical properties, such as molecular weight, or chemical properties, such as chemical formulae, all combinations, and subcombinations of ranges specific embodiments therein are intended to be included.

The disclosures of each patent, patent application, and publication cited or described in this document are hereby incorporated herein by reference, in their entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed is:

1. A system for generating supercritical or near critical water, comprising:
   a biomass conversion system adapted to produce lignin from a material comprising lignocellulose using supercritical or near critical water;
   a supercritical or near critical water generator adapted to provide supercritical or near critical water to said biomass conversion system, said supercritical or near critical water generator comprising:
      at least one pump adapted to provide water at a pressure of at least about 221 bar to form compressed water; and
      at least one fuel combustion apparatus adapted for combusting a fuel composition comprising said lignin;
      wherein said lignin has a heating value of at least about 3,000 BTU/lb;
   a fuel handling system adapted to transport said lignin from said biomass conversion system to said fuel combustion apparatus; and
   a water circulation system adapted to transport said compressed water in proximity of said fuel combustion apparatus adequate to heat said compressed water to a temperature of at least about 373° C. to produce said supercritical or near critical water.

2. The system of claim 1,
   wherein said lignin has a heating value of at least about 5,000 BTU/lb.

3. The system of claim 1,
   wherein said lignin has a heating value of at least about 7,500 BTU/lb.

4. The system of claim 1, further comprising:
   at least one dryer for said fuel composition comprising lignin.

5. The system of claim 1,
   wherein said lignin is in a powdered form.

6. The system of claim 5,
   wherein said lignin is in a pelletized form.

7. The system of claim 5,
   wherein said lignin is in a liquid form.

8. The system of claim 1, further comprising:
   a preheater for said water or said compressed water in association with said water circulation system.

9. The system of claim 8,
   wherein said preheater heats said water or said compressed water to a temperature of about 100° C. to about 300° C.

* * * * *